United States Patent
Cochran

(10) Patent No.: US 7,344,623 B2
(45) Date of Patent: Mar. 18, 2008

(54) SYSTEM AND METHOD FOR RADIALLY POSITIONING A WORKPIECE FOR ELECTROCHEMICAL MACHINING

(75) Inventor: Dustin A. Cochran, Watsonville, CA (US)

(73) Assignee: Seagate Technology LLC, Scotts Valley, CA (US)

(*) Notice: Subject to any disclaimer, the term of this patent is extended or adjusted under 35 U.S.C. 154(b) by 387 days.

(21) Appl. No.: 10/692,240

(22) Filed: Oct. 22, 2003

(65) Prior Publication Data

US 2004/0140223 A1 Jul. 22, 2004

Related U.S. Application Data

(60) Provisional application No. 60/441,684, filed on Jan. 21, 2003.

(51) Int. Cl.
*B23H 3/00* (2006.01)
*C25F 7/00* (2006.01)
*C25F 3/14* (2006.01)

(52) U.S. Cl. ............... 204/224 R; 204/224 M; 204/243; 204/275.1; 204/286.1; 205/640; 205/652; 205/686

(58) Field of Classification Search ............ 204/224 R, 204/224 M, 242, 288.3; 205/652, 654, 662–663
See application file for complete search history.

(56) References Cited

U.S. PATENT DOCUMENTS 6,267,869 B1 * 7/2001 MacLeod et al. ........... 205/668
6,355,148 B1    3/2002 Cochran

FOREIGN PATENT DOCUMENTS

FR    2436643    4/1980

* cited by examiner

*Primary Examiner*—Roy King
*Assistant Examiner*—Lois Zheng
(74) *Attorney, Agent, or Firm*—Darby & Darby P.C.

(57) ABSTRACT

A system and method are described for radially positioning a workpiece for electrochemical machining. In one embodiment, a pressurized air chamber is configured to contain pressurized air. In addition, an expandable diaphragm is configured to position the workpiece radially relative to an electrode assembly in response to the pressurized air being released into the pressurized air chamber.

18 Claims, 4 Drawing Sheets

SYSTEM AND METHOD FOR RADIALLY POSITIONING A WORKPIECE FOR ELECTROCHEMICAL MACHINING

CROSS-REFERENCE TO RELATED APPLICATION

This application relates to, and claims the priority benefit of, U.S. Provisional Patent Application No. 60/441,684, titled "Expandable Ring Workholder for ECM," filed on Jan. 21, 2003. The subject matter of the related application is hereby incorporated by reference.

This application also is related to application Ser. No. 10/609,895 (now abandoned), titled "Critical Orifice Gap Setting for ECM Grooving of Flat Plates," filed Jun. 30, 2003. The subject matter of this related application also is hereby incorporated by reference.

BACKGROUND OF THE INVENTION

1. Field of the Invention

This invention relates generally to electrochemical machining and more specifically to a system and method for radially positioning a workpiece for electrochemical machining.

2. Description of the Background Art

As set forth in the related application, a very small and consistent machining gap must be maintained between a workpiece and an electrode to electromechanically machine grooves into the workpiece effectively. In fact the accuracy and consistency of the machining gap are oftentimes the most important factors in controlling the width and depth as well as the variability of electrochemically machined grooves.

Certain types of workpieces have geometries that require precise radial alignment between the workpiece and the electrode to provide an appropriate machining gap for effective electrochemical machining. Current workpiece holder designs, such as a V-block or a diaphragm chuck, oftentimes are not well suited for precise radial alignment of workpieces because the alignment accuracy of these designs is dependent on the accuracy of the outer diameter of the workpieces. Accurately machining the outer diameters of workpieces to achieve accurate radial alignment using current workpiece holder designs is both time consuming and expensive.

SUMMARY OF THE INVENTION

One embodiment of a system for radially positioning a workpiece for electrochemical machining includes a pressurized air chamber, which is configured to contain pressurized air. The system also includes an expandable diaphragm, which is configured to position the workpiece radially relative to an electrode assembly in response to the pressurized air being released into the pressurized air chamber.

One advantage of the disclosed system is that it provides an expandable diaphragm that is flexible and designed to yield elastically to compensate for errors in the outer diameter of the workpiece. The disclosed system's insensitivity to workpiece outer diameter allows for more accurate radial positioning of the workpiece relative to the electrode assembly, which is critical for certain electrochemical machining applications. In addition, using the disclosed system avoids time consuming and costly machining of the outer diameter of the workpiece. Another advantage of the disclosed system is that, when the expandable diaphragm is pressurized, a hydraulic seal forms between the expandable diaphragm and the workpiece about the entire outer circumference of the workpiece.

DETAILED DESCRIPTION OF THE INVENTION

Figure 1:
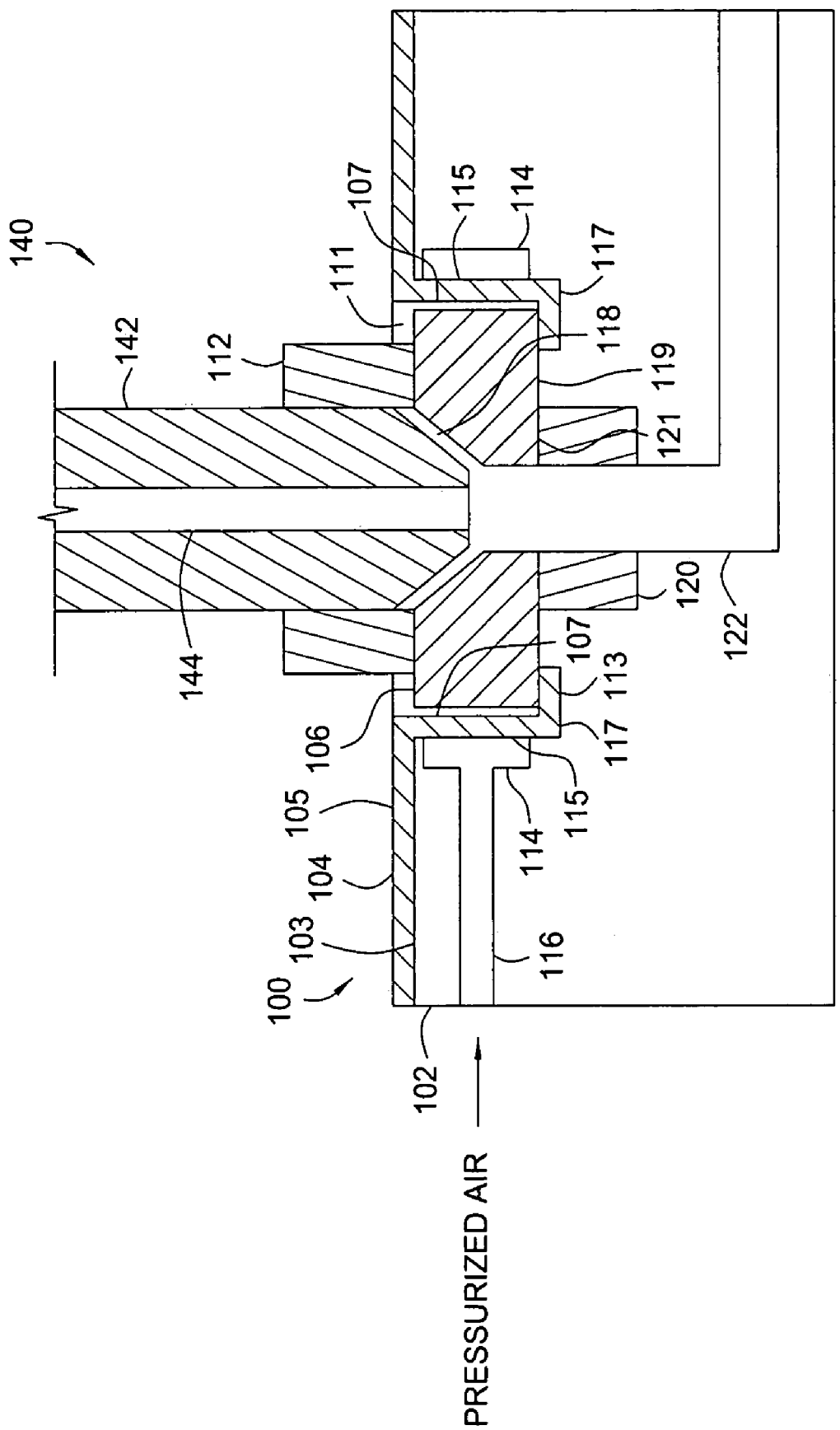
FIG. 1 is a cross-sectional view illustrating a system for radially positioning a workpiece for electrochemical machining, according to one embodiment of the invention.

FIG. 1 is a cross-sectional view illustrating a system 100 for radially positioning a workpiece 106 for electrochemical machining, according to one embodiment of the invention. As shown, system 100 includes, without limitation, a base 102, an expandable diaphragm 104, a pressurized air chamber 114, a clamping ring 112, an anode contact 120, an electrolyte passage 122 and an electrode assembly 140. Base 102 is the overall support for system 100. In one embodiment, base 102 is configured to have a cylindrical shape, the top portion of base 102 having an outer diameter and an inner diameter to form a locating area 111. A wall 107 forms the outer periphery of locating area 111 and a workpiece surface 119, which includes part of the top surface of base 102 and a top surface 121 of anode contact 120, forms the inner diameter of locating area 111. As described herein, when workpiece 106 is loaded into system 100 for electrochemical machining (hereinafter referred to as "ECM"), workpiece 106 is placed within locating area 111 such that workpiece 106 sits upon workpiece surface 119. In one embodiment, base 102 comprises a plastic resin such as ULTEM 1000 (registered trademark of General Electric Corp., registered on May 11, 1982 (a PolyEtherImide material)). Persons skilled in the art will recognize that the material composition of base 102 in no way limits the scope of the invention.

Expandable diaphragm 104 is primarily responsible for radially locating and horizontally clamping workpiece 106 for the ECM process. As shown, expandable diaphragm 104 includes a flange portion 105, a thin wall 115 and a foot 117. Expandable diaphragm 104 is attached to base 102 such that a seal forms between thin wall 115 and wall 107 of locating area 111 that enables pressurized air to be released into pressurized air chamber 114 without any substantial leakage. As described in further detail below in conjunction with FIGS. 2 and 3, thin wall 115 is configured to deflect elastically and uniformly about workpiece 106 when pressurized air is released into pressurized air chamber 114. This elastic deflection radially positions workpiece 106 relative to electrode assembly 140 and horizontally clamps workpiece 106 into system 100. In addition, a hydraulic seal forms between expandable diaphragm 104 and workpiece 106 when expandable diaphragm 104 is so pressurized. Flange portion 105 is attached to a top face 103 of base 102, and foot 117 is attached to a recessed area 113 of base 102, to prevent expandable diaphragm 104 from being blown off of base 102 when pressurized air is released in to pressurized air chamber 114.

Base 102 is configured with a radial groove in wall 107 that extends about the outer periphery of locating area 111. The radial groove forms a plenum that surrounds thin wall 115 when expandable diaphragm 104 is attached to base 102. This plenum comprises pressurized air chamber 114, which is configured to contain pressurized air. As shown, pressurized air port 116 extends through one side of base 102 to pressurized air chamber 114, coupling pressurized air chamber 114 with an external pressurized air source (not shown). Pressurized air may be released from the external pressurized air source, through pressurized air port 116, into pressurized air chamber 114. Once contained in pressurized air chamber 114, the pressurized air exerts pressure against thin wall 115. In one embodiment, the pressurized air has a pressure of approximately 50-100 pounds per square inch.

Anode contact 120, which is coupled to an external electrical source (not shown), provides an electrical contact for workpiece 106. As persons skilled in the art will understand, when workpiece 106 is coupled to top surface 121 of anode contact 120, workpiece 106 also becomes coupled to the external electrical source. This coupling enables workpiece 106 to act as an anode for the ECM process, as described in the related application. As shown, anode contact 120 is configured with a bore hole to allow conductive electrolyte to pass from one end of anode contact 120 to the other. In one embodiment, anode contact 120 comprises titanium such that anode contact 120 is resistant to anodic corrosion. In an alternative embodiment, anode contact 120 may be coated with titanium. In yet other embodiments, anode contact 120 may comprise or may be coated with other conductive materials that demonstrate similar resistance to anodic corrosion.

Clamping ring 112 is primarily responsible for vertically clamping workpiece 106 into system 100 for the ECM process. As described herein, clamping ring 112 is configured to be lowered onto workpiece 106 after pressurized air chamber 114 has been pressurized and workpiece 106 has been radially positioned and horizontally clamped and to clamp workpiece 106 against workpiece surface 119. Among other things, clamping workpiece 106 with clamping ring 112 ensures that workpiece 106 is properly coupled to workpiece surface 119 such that a clean electrical connection is made between workpiece 106 and anode contact 120.

Electrolyte passage 122 is primarily responsible for passing conductive electrolyte to or from workpiece 106 for the ECM process. In one embodiment, electrode assembly 140 provides the conductive electrolyte for the ECM process, and electrolyte passage 122 acts as an exhaust port for the conductive electrolyte. In an alternative embodiment, the conductive electrolyte for the ECM process may be provided through electrolyte passage 122.

Also shown in FIG. 1 is an electrode assembly 140, which, as described in further detail in the related application, provides the other half of the circuit necessary for the ECM process. An electrode 142 is configured to provide the pattern machined into workpiece 106 using the ECM process and to act as a cathode for the ECM process. An electrolyte channel 144 is disposed within electrode 142 and, in one embodiment, provides the conductive electrolyte used in the ECM process. A cathodic electrical source (not shown) is coupled to electrode 142 and provides the current necessary for the ECM process. Electrode assembly 140 is separated from workpiece 106 during the ECM process by a machining gap 118.

In one embodiment, the process of radially positioning workpiece 106 begins by loading workpiece 106 into system 100. Workpiece 106 is placed within locating area 111 such that workpiece 106 sits upon workpiece surface 119. The external pressurized air source then releases pressurized air, through pressurized airport 116, into pressurized air chamber 114. The pressurized air exerts pressure against thin wall 115 of expandable diaphragm 104, causing thin wall 115 to deflect elastically and uniformly about workpiece 106. This deflection radially positions workpiece 106 relative to electrode assembly 140 and horizontally clamps workpiece 106 into system 100. Clamping ring 112 is then lowered on top of workpiece 106 to clamp workpiece 106 against workpiece surface 119, thereby vertically clamping workpiece 106 into system 100. In addition, a hydraulic seal forms between expandable diaphragm 104 and workpiece 106 when expandable diaphragm 104 is so pressurized. Clamping workpiece 106 with clamping ring 112 ensures that a clean electrical connection is made between workpiece 106 and anode contact 120 such that workpiece 106 may act as the anode for the ECM process.

Figure 2:
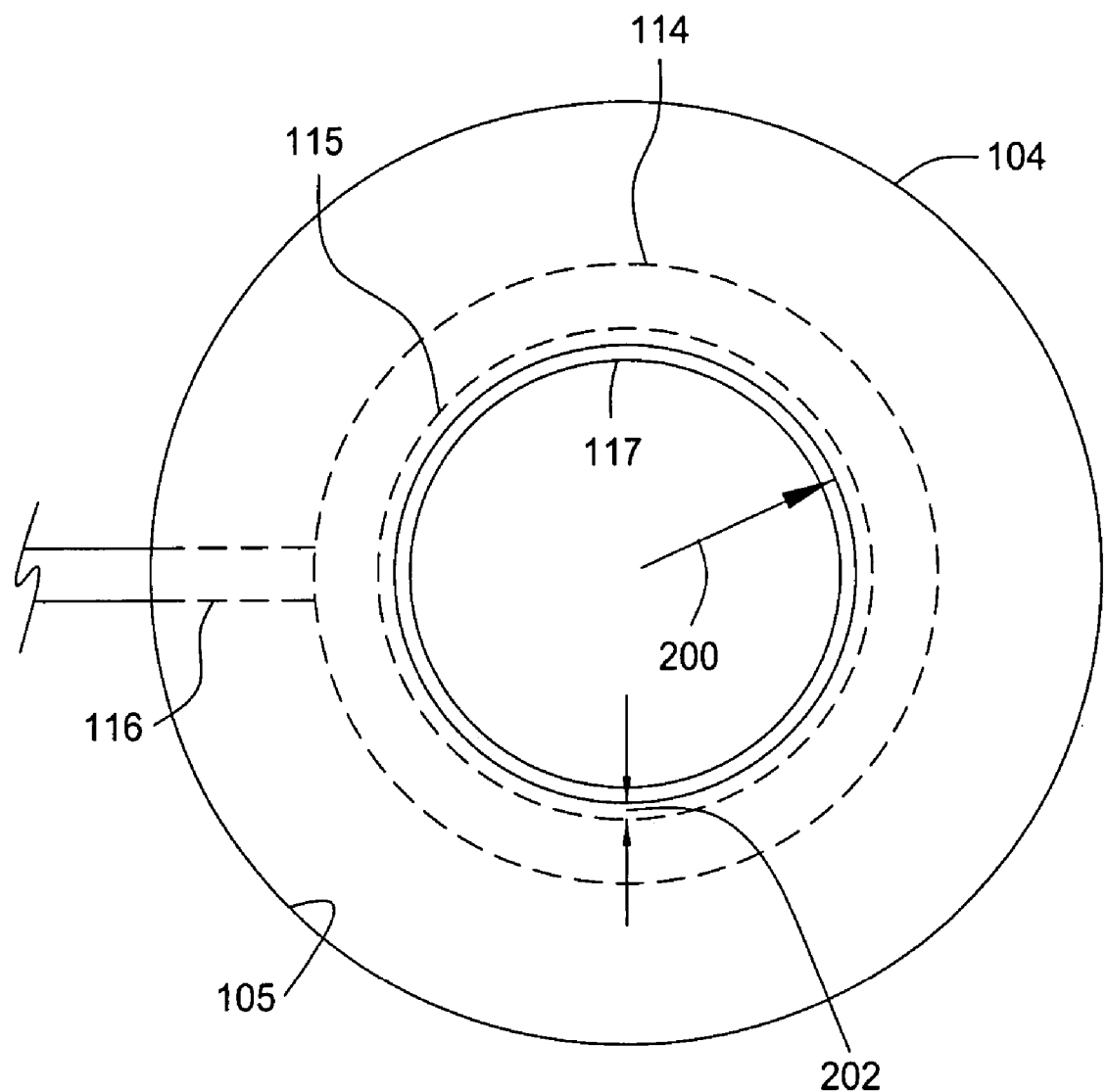
FIG. 2 is a top view of the expandable diaphragm of FIG. 1, according to one embodiment of the invention.

FIG. 2 is a top view of expandable diaphragm 104 of FIG. 1, according to one embodiment of the invention. As shown, expandable diaphragm 104 includes an inner radius 200 and a thickness 202 of thin wall 115. As persons skilled in the art will understand, inner radius 200 and thickness 202 may be selected such that thin wall 115 behaves similarly to a thin-walled pressure vessel when pressurized air contained in pressurized air chamber 114 exerts pressure on thin wall 115. Among other things, this means that the resulting stresses in thin wall 115 caused by the pressure exerted on thin wall 115 by the pressurized air are nearly uniform throughout thickness 202 of thin wall 115 as well as throughout the height of thin wall 115. As persons skilled in the art also will understand, and as described in further detail below in conjunction with FIG. 3, one may accurately calculate the elastic deflection of thin wall 115 caused by a given uniform stress created in thin wall 115 by the pressure exerted by the pressurized air. In one embodiment, thickness 202 is approximately 150 microns.

Persons skilled in the art will recognize that if thickness 202 of thin wall 115 varies by more than 5-10 microns in any one place, then the elastic deflection of thin wall 115 may not be consistent and uniform about the circumference traversed by thin wall 115. As the consistency and uniformity of the elastic deflection of thin wall 115 tend to be critical to positioning workpiece 106 radially relative to electrode assembly 140, in one embodiment, the thickness 202 of thin wall 115 does not vary by more than approximately 5-10 microns in any one place.

Persons skilled in the art also will recognize that the maximum stress created in thin wall 115 (and the maximum deflection of thin wall 115, described in further detail below in conjunction with FIG. 3) should remain within the elastic range of the material that expandable diaphragm 104 comprises to prevent thin wall 115 from permanently yielding or rupturing during the clamping process. Factors to consider when selecting the material for expandable diaphragm 104 include, without limitation, the modulus of elasticity and the ultimate yield strength of the material, the material's resistance to corrosion, the water absorption properties of the material (i.e., the material's absorbing too much water may adversely affect the ability of thin wall 115 to deflect uniformly), and the ability of the material to contain the pressurized air within pressurized air chamber 114 (i.e., the material should not be porous). Experimentation has shown that plastics work well for expandable diaphragm 104 because, among other things, plastics deform easily to form a good seal between thin wall 115 and wall 107 as well as between thin wall 115 and workpiece 106 when expandable diaphragm 104 is pressurized. In one embodiment, expandable diaphragm 104 comprises ULTEM 1000. In other embodiments, expandable diaphragm 104 may comprise any other plastic, metal or other material that demonstrates the requisite mechanical properties described herein.

In one embodiment, expandable diaphragm 104 is glued to base 102. In other embodiments, expandable diaphragm 104 may be attached to base 102 in any way that prevents expandable diaphragm 104 from being blown off of base 102 when pressurized air is released into pressurized air chamber 114, allows a proper seal to form between thin wall 115 and wall 107 and allows for proper elastic deflection of thin wall 115 when pressurized air is released into pressurized air chamber 114.

Figure 3:
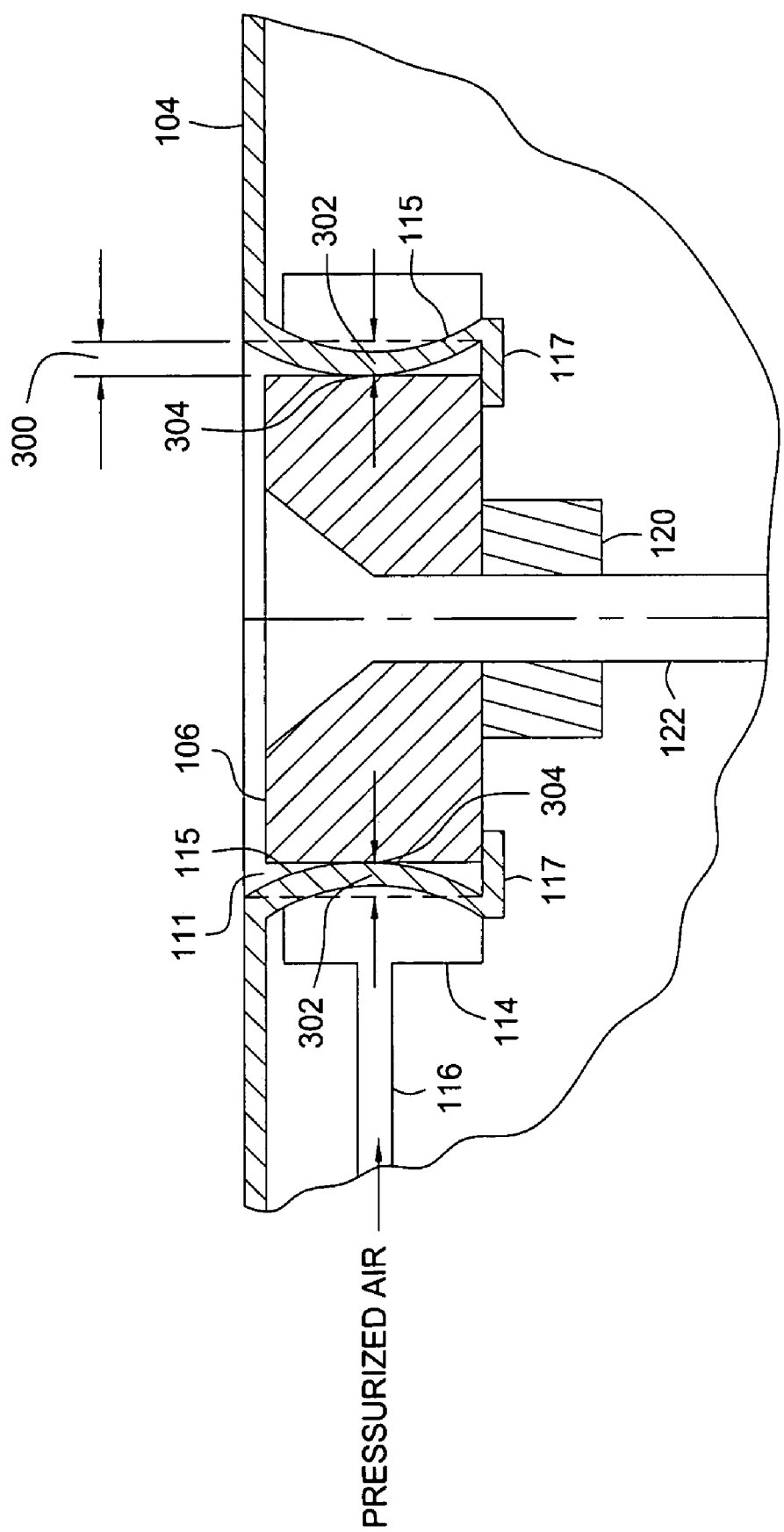
FIG. 3 is a cross-sectional view illustrating the configuration of the workpiece and the expandable diaphragm of FIG. 1 when pressurized air is released into the pressurized air chamber, according to one embodiment of the invention.

FIG. 3 is a cross-sectional view illustrating the configuration of workpiece 106 and expandable diaphragm 104 of FIG. 1 when pressurized air is released into pressurized air chamber 114, according to one embodiment of the invention. As shown, thin wall 115 has a maximum elastic deflection 302 at an apex 304. Persons skilled in the art will understand that maximum elastic deflection 302 may be calculated accurately given the pressure of the pressurized air in pressurized air chamber 114, the dimensions of thin wall 115 and the mechanical properties of the material that expandable diaphragm 104 comprises. As described herein, expandable diaphragm 104 is configured such that the stress at apex 304 is within the elastic range of the material that expandable diaphragm 104 comprises. Further, as persons skilled in the art will recognize, expandable diaphragm 104 and locating area 111 are configured such that maximum elastic deflection 302 is sufficiently greater than a gap 300, which represents the distance between workpiece 106 and thin wall 115 before pressurized air is released into pressurized air chamber 114, to enable expandable diaphragm 104 to position workpiece 106 radially as described herein.

In one embodiment, thin wall 115 elastically deflects up to 75 microns when pressurized air is released into pressurized air chamber 114, and gap 300 is configured such that the accuracy of radially positioning workpiece 106 relative to electrode assembly 140 is on the order of approximately 2 microns. As persons skilled in the art will recognize, with an elastic deflection of thin wall 115 of 75 microns, the outer diameter of workpiece 106 may vary up to 100 microns without any substantial loss of clamping accuracy. In other embodiments, different amounts of elastic deflection of thin wall 115 and varying degrees of clamping accuracy may be achieved depending on the specific configurations of expandable diaphragm 104 and locating area 111.

As also shown in FIG. 3, expandable diaphragm 104 and locating area 111 are configured such that apex 304 contacts workpiece 106 at a point disposed approximately half way along the height of workpiece 106. In other embodiments, apex 304 may contact workpiece 106 at any point along the height of workpiece 106.

Figure 4:
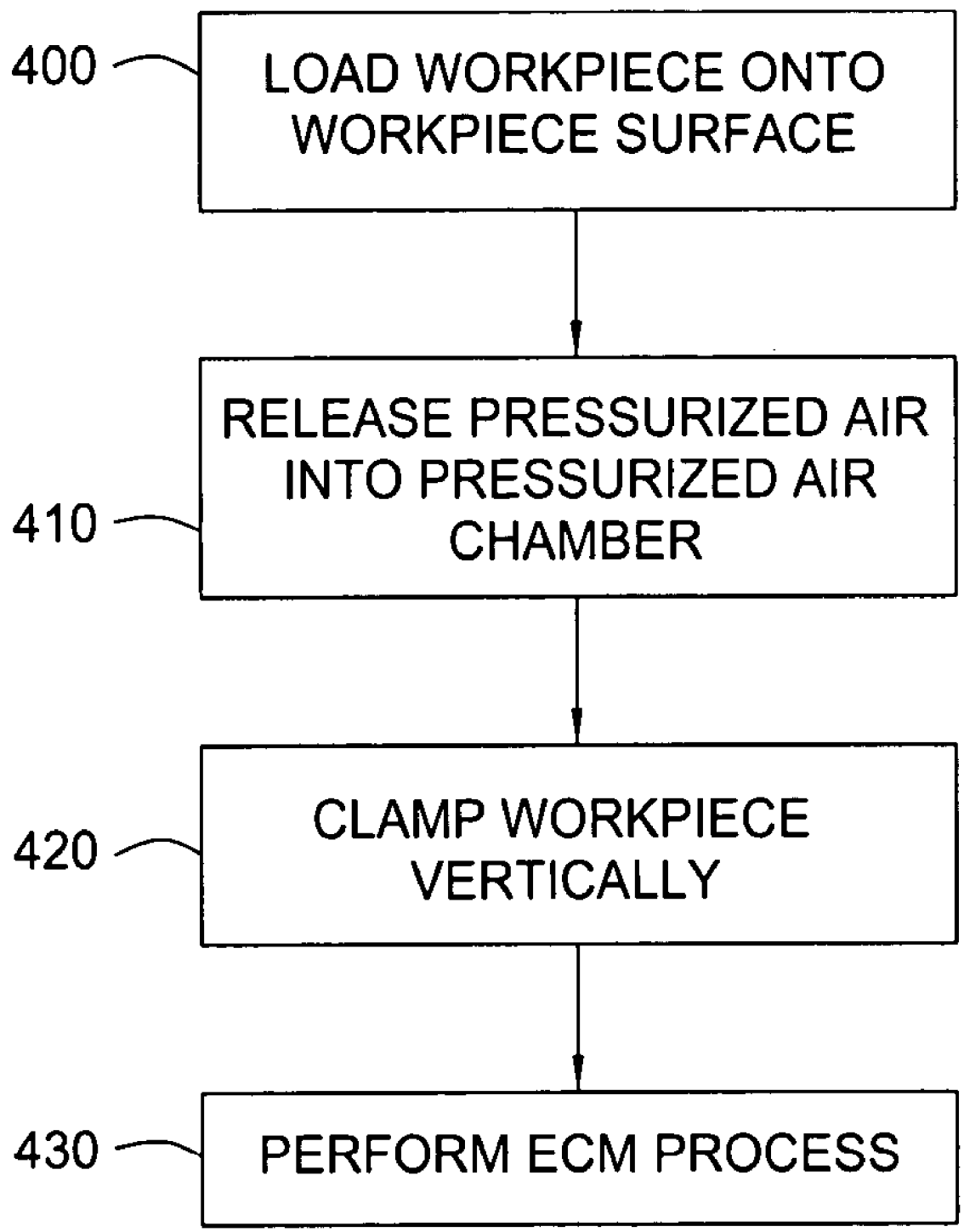
FIG. 4 is a flow chart of method steps for radially positioning a workpiece for electrochemical machining, according to one embodiment of the invention.

FIG. 4 is a flow chart of method steps for radially positioning a workpiece for electrochemical machining, according to one embodiment of the invention. Although the method steps are described in the context of the systems illustrated in FIGS. 1-3, any system configured to perform the method steps in any order is within the scope of the invention.

As shown in FIG. 4, the method of radially positioning a workpiece starts in step 400 where workpiece 106 is loaded onto workpiece surface 119 within locating area 111. In step 410, the external pressurized air source releases pressurized air, through pressurized airport 116, into pressurized air chamber 114. The pressurized air exerts pressure against thin wall 115 of expandable diaphragm 104, causing thin wall 115 to deflect elastically and uniformly about workpiece 106. As described herein, this deflection radially positions workpiece 106 relative to electrode assembly 140 and horizontally clamps workpiece 106 into system 100. In addition, a hydraulic seal forms between expandable diaphragm 104 and workpiece 106 when expandable diaphragm 104 is so pressurized.

In step 420, clamping ring 112 is lowered on top of workpiece 106 to clamp workpiece 106 against workpiece surface 119, thereby vertically clamping workpiece 106 into system 100. Among other things, clamping workpiece 106 with clamping ring 112 ensures that a clean electrical connection is made between workpiece 106 and anode contact 120 such that workpiece 106 may act as the anode for the ECM process.

In step 430, the ECM process is performed on workpiece 106, as described in further detail in the related application. In one embodiment, electrolyte channel 144 of electrode assembly 140 provides the conductive electrolyte used in the ECM process.

One advantage of the system and method described above is that, among other things, system 100 provides expandable diaphragm 104 that is flexible and designed to yield elastically to compensate for errors in the outer diameter of workpiece 106. The insensitivity of system 100 to workpiece 106 outer diameter allows for more accurate radial positioning of workpiece 106 relative to electrode assembly 140, which is critical for certain ECM applications. In addition, using system 100 avoids time consuming and costly machining of the outer diameter of workpiece 106. Another advantage of system 100 is that, when expandable diaphragm 104 is pressurized, a hydraulic seal forms between expandable diaphragm 104 and workpiece 106 about the entire outer circumference of workpiece 106.

The invention has been described above with reference to specific embodiments. Persons skilled in the art, however, will understand that various modifications and changes may be made thereto without departing from the broader spirit and scope of the invention as set forth in the appended claims. For example, system 100 may be used to radially position workpieces 106 having different geometries. In one embodiment, system 100 may be used to position workpiece 106 having a conically-shaped center, as depicted in FIG. 1. In an alternative embodiment, workpiece 106 may have a cylindrically-shaped center. In yet another alternative embodiment, the center of workpiece may comprise any geometry for which proper radial alignment of workpiece 106 with electrode assembly 140 is critical for the ECM process. In addition, in one embodiment, workpiece 106 may be loaded into system 100 automatically. In an alternative embodiment, workpiece 106 may be loaded into system 100 manually. Similarly, in one embodiment, pressurized air is released from the pressurized air source into pressurized air chamber 114 automatically. In an alternative embodiment, pressurized air may be released from the pressurized air source into pressurized air chamber 114 manually. The foregoing description and drawings are, accordingly, to be regarded in an illustrative rather than a restrictive sense.

What is claimed is:

1. A system for radially positioning a workpiece for electrochemical machining, the system comprising: a base having a cavity to hold the workpiece, an electrode assembly, a pressurized air chamber configured to contain pressurized air; an expandable diaphragm configured to position the workpiece radially relative to the electrode assembly in response to the pressurized air being released into the pressurized air chamber, a clamping ring, an anode contact, and an electrolyte passage, wherein the base is the support for the system, the base has a locating area for placing the workpiece, the anode contact forms a portion of the locating area such that the workpiece sits upon the anode contact; and the clamping ring surrounds the electrode assembly.

2. The system of claim 1, further comprising a workpiece surface configured to receive the workpiece when the workpiece is loaded into the system such that the workpiece sits upon the workpiece surface.

3. The system of claim 2, further comprising a clamping ring configured to clamp the workpiece against the workpiece surface.

4. The system of claim 3, wherein the workpiece surface includes an anode contact to which the workpiece is electrically coupled when clamped against the workpiece surface.

5. The system of claim 1, further comprising a pressurized air port coupled to the pressurized air chamber, the pressurized air being released into the pressurized air chamber through the pressurized air port.

6. The system of claim 1, wherein the expandable diaphragm includes a thin wall configured to deflect in response to the pressurized air being released into the pressurized air chamber, the deflection causing the workpiece to position radially relative to the electrode assembly.

7. The system of claim 6, wherein the deflection is approximately 75 microns.

8. The system of claim 6, wherein the thin wall has a thickness of approximately 150 microns.

9. The system of claim 8, wherein the thickness of the thin wall does not vary by more than approximately 5-10 microns in any one place.

10. The system of claim 1, wherein the expandable diaphragm radially positions the workpiece with an accuracy of approximately 2 microns.

11. A system for radially positioning a workpiece for electrochemical machining, the system comprising: a base having a cavity to hold the workpiece, the cavity having an electrode contact therein, a pressurized air chamber for deflecting a thin wall of an expandable diaphragm, the deflection causing the workpiece to position radially relative to an electrode assembly, wherein the workpiece is positioned by the system to permit electrochemical machining of the electrode assembly, a clamping ring, an anode contact, and an electrolyte passage, wherein the base is the support for the system, the base has a locating area for placing the workpiece, the anode contact forms a portion of the locating area such that the workpiece sits upon the anode contact; and the clamping ring surrounds the electrode assembly.

12. The system of claim 11, further comprising an air port for releasing a pressurized air into a pressurized air chamber.

13. The system of claim 12, further comprising a clamping ring for clamping the workpiece against the workpiece surface.

14. The system of claim 13, wherein the workpiece surface includes an anode contact to which the workpiece is electrically coupled when clamped against the workpiece surface.

15. The system of claim 1, further comprising an electrode passage for passing a conductive electrolyte to or from the workpiece for electrochemical machining.

16. The system of claim 1, wherein the expandable diaphragm when pressurized forms a hydraulic seal between the expandable diaphragm and the workpiece about an entire outer circumference of the workpiece.

17. The system of claim 1, further wherein the electrolyte passage is in the base.

18. The system of claim 1, wherein the expandable diaphragm comprises a flange portion, a wall and a foot; the expandable diaphragm being attached to the base such that a seal forms between the wall and the locating area.

* * * * *